United States Patent
Wlodarczyk

(10) Patent No.: US 11,083,918 B2
(45) Date of Patent: Aug. 10, 2021

(54) EXTINGUISHING SYSTEM FOR A HIGH-VOLTAGE BATTERY OF A MOTOR VEHICLE AND MOTOR VEHICLE WITH AN EXTINGUISHING SYSTEM FOR A HIGH-VOLTAGE BATTERY

(71) Applicant: AUDI AG, Ingolstadt (DE)

(72) Inventor: Peter Wlodarczyk, Oedheim (DE)

(73) Assignee: AUDI AG, Ingolstadt (DE)

( * ) Notice: Subject to any disclaimer, the term of this patent is extended or adjusted under 35 U.S.C. 154(b) by 236 days.

(21) Appl. No.: 16/502,578

(22) Filed: Jul. 3, 2019

(65) Prior Publication Data
US 2020/0016443 A1  Jan. 16, 2020

(30) Foreign Application Priority Data
Jul. 12, 2018  (DE) .......................... 102018211629.6

(51) Int. Cl.
*A62C 3/07*  (2006.01)
*A62D 1/00*  (2006.01)
(Continued)

(52) U.S. Cl.
CPC .................. *A62C 3/07* (2013.01); *A62C 3/16* (2013.01); *A62C 35/10* (2013.01); *A62C 37/40* (2013.01);
(Continued)

(58) Field of Classification Search
CPC .. A62C 3/07; A62C 3/16; A62C 13/62; A62C 35/08; A62C 35/10; A62C 35/11;
(Continued)

(56) References Cited

U.S. PATENT DOCUMENTS

2009/0205846 A1\* 8/2009 Zeweke ................ A62C 37/36
169/45
2011/0189511 A1\* 8/2011 Yoon ..................... H01M 10/61
429/50
(Continued)

FOREIGN PATENT DOCUMENTS

CN        104353204 A    2/2015
CN        205759224 U    12/2016
(Continued)

OTHER PUBLICATIONS

Office Action dated Aug. 5, 2020 in corresponding Chinese Application No. 201910623245.2; 19 pages including English-language translation.
(Continued)

*Primary Examiner* — Cody J Lieuwen
(74) *Attorney, Agent, or Firm* — Maier & Maier, PLLC

(57) ABSTRACT

An extinguishing system for a high-voltage battery of a motor vehicle, including at least one extinguishing agent container with a gaseous extinguishing agent; a seal for sealing the extinguishing agent container, which prevents an outflow of the extinguishing agent into the interior of the high-voltage battery; a control device interacting with the seal device, designed to open the seal upon the incidence of a triggering signal, thus allowing the extinguishing agent to flow into the interior of the high-voltage battery and to displace any air included therein; an auto-ignition mechanism that interacts with the seal, which auto-ignites at a certain auto-ignition temperature and opens the seal.

20 Claims, 1 Drawing Sheet

(51) Int. Cl.
*A62C 37/40* (2006.01)
*G08B 17/00* (2006.01)
*A62C 35/10* (2006.01)
*A62C 3/16* (2006.01)

(52) U.S. Cl.
CPC ............ *A62D 1/0092* (2013.01); *G08B 17/00* (2013.01); *H01M 2200/103* (2013.01)

(58) Field of Classification Search
CPC ......... A62C 35/13; A62C 37/40; A62C 37/44; A62D 1/0092; G08B 17/00; H01M 2200/103
USPC .................................................. 169/9, 60–62
See application file for complete search history.

(56) References Cited

U.S. PATENT DOCUMENTS

| | | | | |
|---|---|---|---|---|
| 2013/0011706 | A1* | 1/2013 | Wood | H01M 10/613 429/90 |
| 2014/0017525 | A1* | 1/2014 | Schaefer | H01M 10/658 429/61 |
| 2014/0186668 | A1* | 7/2014 | Jung | H01M 10/4207 429/61 |
| 2017/0113080 | A1* | 4/2017 | Specht | A62C 3/16 |
| 2017/0214103 | A1 | 7/2017 | Onnerud et al. | |
| 2018/0214722 | A1* | 8/2018 | Murray | A62C 3/006 |
| 2018/0289996 | A1* | 10/2018 | Kim | A62C 3/07 |
| 2019/0319234 | A1* | 10/2019 | Cordani | H01M 10/658 |
| 2019/0334146 | A1* | 10/2019 | Lai | B60L 58/10 |

FOREIGN PATENT DOCUMENTS

| | | |
|---|---|---|
| CN | 107019863 A | 8/2017 |
| CN | 107158615 A | 9/2017 |
| DE | 2220720 A1 | 11/1973 |
| DE | 102005051214 A1 | 5/2007 |
| DE | 102008059948 A1 | 6/2010 |
| DE | 102011008792 A1 | 7/2012 |
| DE | 102012021095 A1 | 5/2013 |
| DE | 102013018403 A1 | 5/2015 |
| DE | 102013018408 A1 | 5/2015 |
| DE | 102014215036 A1 | 2/2016 |
| DE | 102015213777 A1 | 1/2017 |
| EP | 2 755 275 B1 | 6/2017 |

OTHER PUBLICATIONS

Chinese Office Action dated Mar. 5, 2021, in connection with corresponding CN Application No. 201910623245.2 (25 pp., including machine-generated English translation).

Golubkov, Andrey W., et al., "Thermal Runaway: Causes and Consequences on Cell Level." A Chapter in "Automotive Battery Technology" edited by Thaler, Alexander, and Watzenig, Daniel. Springer International Publishing AC. 2014. 4 pages.

German Search Report dated Jun. 3, 2019 in corresponding German Application No. 102018211629.6; 28 pages.

* cited by examiner

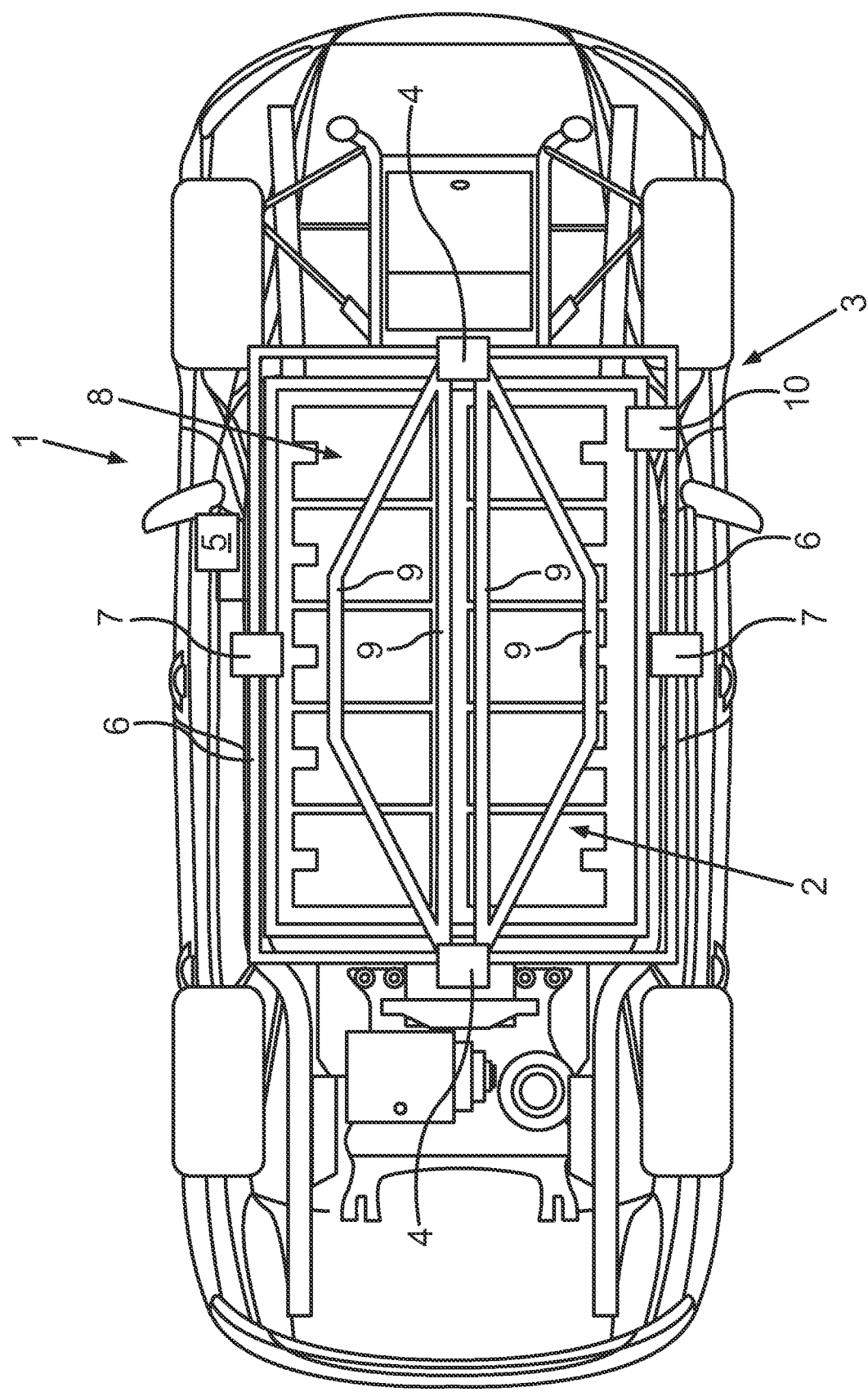

EXTINGUISHING SYSTEM FOR A HIGH-VOLTAGE BATTERY OF A MOTOR VEHICLE AND MOTOR VEHICLE WITH AN EXTINGUISHING SYSTEM FOR A HIGH-VOLTAGE BATTERY

FIELD

The disclosure relates to an extinguishing system for a high-voltage battery of a motor vehicle and to a motor vehicle with an extinguishing system for a high-voltage battery.

BACKGROUND

In electrically driven motor vehicles, typically, high-voltage batteries are installed that supply the electric motors serving for driving the motor vehicle with energy. High-voltage batteries on a lithium-ion basis are very common. However, other cell technologies are certainly used as well. Lithium ion cells in particular can enter into a critical state, for instance due to internal short-circuits, contaminations, or in case of a crash. If a transition in such a critical state is not interrupted in a timely manner, this may lead to a fire or even to a thermal runaway of the battery cells. In principle, in motors with high-voltage batteries, it is therefore necessary to provide mechanisms that can prevent the incidence, or at least the spreading, of a combustion of a high-voltage battery. Some solutions are already known from prior art.

DE 10 2014 215 036 A1 presents a method for neutralizing battery cells, in which a pressurized neutralizing solution is injected into an interior space of the battery cells. This neutralizing solution can bind hazardous degassing substances, gases, aerosols, drops, and particles of degassing battery cells bound or neutralize hazardous degradation products.

EP 2 755 275 B1 shows a device for suppressing a fire in a battery. The device comprises a container with a fire-suppressing chemical substance and a control device designed to convey the chemical substance into the battery when a fire in the battery is detected by a fire sensor.

DE 10 2015 213 777 A1 presents a device for fire prevention and fire suppression in a battery module, comprising a storage container for an extinguishing agent and control means, designed such that when a triggering condition is met, the extinguishing agent is released into the interior space of the enclosure of the battery module.

SUMMARY

The task of the present invention is to provide a solution by means of which the incidence and the spreading of a fire in a high-voltage battery of a motor vehicle can be prevented in a particularly reliable manner.

The inventive extinguishing system for a high-voltage battery of a motor vehicle comprises at least one extinguishing agent container with a gaseous extinguishing agent. The gaseous extinguishing agent may be pressurized, such that it may exit the extinguishing agent container independently and rapidly when the container is opened. Furthermore, the extinguishing system comprises a seal for sealing the container with the extinguishing agent, thus preventing its escape into the interior of the high-voltage battery. A control device interacting with the seal device is designed to open the seal upon the incidence of a triggering signal, thus allowing the extinguishing agent to flow into the interior of the high-voltage battery and to displace any air comprised therein. The extinguishing system further comprises an auto-ignition mechanism that interacts with the seal, which auto-ignites at a certain auto-ignition temperature and opens the seal.

As soon as the seal is opened, the gaseous extinguishing agent in the container can flow into the interior of the high-voltage battery, such that any air previously present in the high-voltage battery is displaced. The extinguishing agent may, for instance, be an aerosol, comprising solid or liquid floating particles that have a fire-retarding or a fire-extinguishing effect. When the seal is open, the gaseous extinguishing agent particular serves to displace the air present in the high-voltage battery from that battery. Therefore, the oxygen in the air is displaced from the interior of the high-voltage battery as well, such that a fire cannot even start in the high-voltage battery, and a fire that has already started can be contained.

It is possible to actuate the seal electronically upon the incidence of the said triggering signal by means of the control device that interacts with the seal, and thus cause the extinguishing agent to reach the interior of the high-voltage battery. The auto-ignition mechanism that interacts with the seal, which auto-ignites and opens the seal when the auto-ignition temperature is reached, is material for the extinguishing system according to the invention. The auto-ignition mechanism provides a redundancy in the extinguishing system, allowing it to function even in the event of a total failure of the board net or the onboard electronics of the motor vehicle, for instance, even when the control device itself is no longer functioning.

If, for instance as a result of a crash of the motor vehicle, the control device is no longer functional, the auto-ignition mechanism is still able to open the seal reliably and automatically as soon as the auto-ignition temperature is reached, thus allowing the extinguishing agent to flow into the interior of the high-voltage battery and to prevent the start of a fire or to contain an already existing fire. Thus, based on the redundant operating principles for opening the seal, a particularly reliable and fail-safe solution is provided, by means of which the incidence and spreading of a fire of a high-voltage battery can be particularly reliably prevented.

An advantageous embodiment of the invention provides that the auto-ignition mechanism features a fuse, which lights itself when the auto-ignition temperature is reached and opens the seal. The fuse may, for instance, be integrated in the seal or in the container of the extinguishing agent, ensuring that the seal is opened automatically when the auto-ignition temperature is reached. The fuse of the auto-ignition mechanism may for instance be integrated in the seal when the seal of the extinguishing agent container is manufactured. The extinguishing agent container, or respectively the seal, are formed such that when the fuse the is lit the seal is automatically opened, followed by the flow of the extinguishing agent into the interior of the high-voltage battery.

An additional advantageous embodiment of the invention provides that the control device have a signaling connection with a crash sensor on in order to provide the triggering signal. The crash sensor may, for instance, be integrated into the high voltage battery. Alternatively or additionally, it is also possible for the crash sensor to be installed in the motor vehicle and not in the high-voltage battery as such. The crash sensor may be an acceleration sensor, for instance, or an airbag sensor. As soon as the crash sensor is triggered, it emits the triggering signal sends it onward to the control device. The control device then opens the seal that until now sealed the extinguishing agent container, allowing the extinguishing agent to flow into the interior of the high-voltage battery and to displace any air comprised therein.

According to an additional advantageous embodiment of the invention, it is provided for the control device to have a signaling connection with a temperature sensing system of the extinguishing system, which is designed to measure a temperature of the high-voltage battery and to emit the triggering signal when the measured temperature is higher than a predetermined temperature threshold. The temperature sensing system can reliably measure the temperature of the high-voltage battery on a continuous basis. If the measured temperature exceeds the predetermined temperature, the temperature sensing system emits the triggering signal to the control device, which then opens the seal.

According to an additional advantageous embodiment of the invention, the temperature sensing system comprises temperature sensors integrated in every battery cell of the high-voltage battery for measuring the temperatures of the respective battery cells. This makes it possible to monitor the battery cells individually. If one of the battery cells should exceed the predetermined temperature, the triggering signal is generated by the temperature sensing system and conveyed to the control device, which then opens the seal that until then had kept the container of the extinguishing agent closed. If only one of the battery cells should be faulty, it is possible to prevent a fire in the damaged battery cell by displacing the air in the interior of the high-voltage battery with the inflowing gaseous extinguishing agent. This makes it possible to prevent the entire high-voltage battery from being affected. Thus, it is also possible to replace only the defective battery cell, for instance, rather than having to replace all the battery cells of the high-voltage battery.

An additional advantageous embodiment of the invention provides that the predetermined temperature is below the temperature above which a thermal runaway of the high-voltage battery occurs, and that the auto-ignition temperature is above the specified temperature. It is conceivable, for instance, for the predetermined temperature to be 150 degrees Celsius. As soon as this temperature is reached, the control device will open the seal. In this manner, the oxygen within the high-voltage battery is displaced by the extinguishing agent, which prevents the battery cells of the high-voltage battery from catching fire to begin with. If the control device does not function, for instance because a power supply of the control device is adversely impacted, due to a failure of the board net of the motor vehicle or something similar, the auto-ignition mechanism will automatically ensure that when the auto-ignition temperature is reached, the extinguishing agent will nevertheless reach the interior of the high-voltage battery. Due to the fact that the auto-ignition temperature is higher than the predetermined temperature, it can be ensured that as long as the control device is functional. The starting of a fire can be prevented, without the auto-ignition mechanism being triggered. Moreover, contrary to the auto-ignition mechanism, the control device is reversible, such that after the opening of the seal, the extinguishing agent only has to be exchanged and refilled.

In an additional advantageous embodiment of the invention, it is provided for the auto-ignition temperature to be in the range of the temperature above which a thermal runaway of the high-voltage battery occurs. The auto-ignition temperature may, for instance, be selected such that it is a few degrees below the temperature above which a thermal runaway of the high-voltage battery occurs. Thus, primarily in case of a failure of the control device, an extinguishing agent may reach the interior of the high-voltage battery in a timely manner before the thermal runaway of the high-voltage battery occurs. If the temperatures within the high-voltage battery should increase to such a degree that a thermal runaway of the high-voltage battery is impending, at that time at the latest, the auto-ignition mechanism will be triggered, such that the gaseous extinguishing agent will reach the interior of the high-voltage battery. Thus, a thermal runaway of the high-voltage battery can be prevented, or at least delayed.

An additional advantageous embodiment of the invention provides that the extinguishing system features a duct system connected with the extinguishing agent container, intermediated by the seal, with discharge openings through which the extinguishing agent can flow into the interior of the high-voltage battery. Preferably, the duct system is arranged and formed such that each battery cell of the high-voltage battery can be supplied with extinguishing agent through at least one of the discharge openings of the duct system. The duct system allows for a quick and uniform supply of the interior of the high-voltage battery with extinguishing agent.

According to an additional advantageous embodiment of the invention, it is provided that the extinguishing system features at least one pressure relief valve integrated into a housing of the high-voltage battery, through which the air can flow out from the interior of the high-voltage battery when the extinguishing agent flows in. Thus, the air in the high-voltage battery can easily escape, such that the interior of the high-voltage battery can rapidly, reliably, and fully be filled with the extinguishing agent.

In an additional advantageous embodiment of the invention, it is provided that the control device is adapted to issue an alarm signal in the motor vehicle and/or to alert a repair shop as soon as it has opened the seal. Thus, an occupant of the vehicle is informed immediately when the extinguishing system has been actuated. It is also possible that in addition to the alarm signal, information is dispensed about the degree in which the condition of the high-voltage battery is critical. If, for instance, the extinguishing system was triggered in a timely manner, and only one or just a few of the battery cells were affected by a defect and by increased temperatures, it would be conceivable to inform the driver that they are able to travel a few more kilometers, for instance in order to the reach the repair shop that was already automatically informed by the control device. Depending on how critical the condition is of the high-voltage battery, along with the alarm signal, a prompt might be given to the driver to deactivate the vehicle as fast as possible and leave it. Due to the fact that upon the activation of the extinguishing system, the control device can inform the repair shop, technicians and/or rescue teams can be informed immediately that there was a problem with the high-voltage battery of the respective motor vehicle. Thus, the control device might also inform the repair shop how severe the problem with the high-voltage battery is, and relay the position of the motor vehicle. For these purposes, the motor vehicle might, for instance, be cross-linked with a number of repair shops.

The motor vehicle according to the invention comprises a high-voltage battery and the extinguishing system according to the invention, or an advantageous embodiment of the extinguishing system according to the invention.

BRIEF DESCRIPTION OF THE DRAWINGS

Additional advantages, features, and details of the invention follow from the following description a preferred exemplary embodiment, as well as from the drawing. The above features and feature combinations mentioned in the description and the features and feature combinations following below in the description of the FIGURE and/or shown in the FIGURE itself can be used not only in the respective specified combination, but also in other combinations or on their own without being outside of the frame of the invention.

FIG. 1 is a schematic illustration of a motor vehicle with a high-voltage battery and of an extinguishing system for the high-voltage battery.

DETAILED DESCRIPTION

A schematically illustrated motor vehicle 1 comprises a not further specified electrical drive and a high-voltage battery 2 for supplying power to the electrical drive and to other power consumers of the motor vehicle 1. The motor vehicle 1 further comprises an extinguishing system 3 for the high-voltage battery 2. The extinguishing system 3 may, for instance, be integrated in its entirety in the high-voltage battery 2. It is also possible, however, for certain components of the extinguishing system 3 not to be integrated in the high-voltage battery 2. In the present case, the extinguishing system 3 comprises two extinguishing agent containers 4, which might, for instance, be aerosol cartridges. The extinguishing agent containers 4 comprise a gaseous extinguishing agent, for instance an aerosol.

The aerosol may comprise particles that have a fire-retarding, or respectively, a fire-extinguishing effect.

The extinguishing agent containers 4 are fitted with a seal, not shown here, for sealing the extinguishing agent container 4, which prevents the pressurized gaseous extinguishing agent from escaping into the interior of the high-voltage battery 2. The extinguishing system 3 further comprises a control device 5 that interacts with the respective seals, designed to open the seals upon the incidence of a triggering signal, such that the extinguishing agent can flow from its container 4 into the interior of the high-voltage battery 2 and displace the air from it. The extinguishing system 3 further features the auto-ignition mechanisms, not shown here, which interact with the seals, not shown here either, which auto-ignite as of a certain auto-ignition temperature and open the seals. The auto-ignition mechanisms not shown here may respectively feature a fuse, which may auto-ignite as of the auto-ignition temperature and open the seals. This fuse may, for instance, be integrated into the extinguishing agent containers 4 or into the seals.

The control device 5 may have a signal connection with a crash sensor, not shown here, in order to provide the triggering signal. If, due to an accident, the crash sensor is triggered, it conveys the triggering signal to the control device 5, which then opens the seals, such that the extinguishing agent in the containers 4 can reach the interior of the high-voltage battery 2.

The control device 5 has a signaling connection via respective lines 6 with temperature sensors 7 of a not further described temperature sensing system of the extinguishing system 3. The temperature sensors 7, which are only indicated schematically here, can measure a temperature of the high-voltage battery 2 and provide the triggering signal when the measured temperature is higher than a predetermined temperature. Preferably, the temperature sensors 7 are integrated into respective battery cells of the high-voltage battery 2 that are not further described here. As a result, the temperature in every cell can be monitored individually. If, for instance due to a defect of a single battery cell, the temperature of this battery cell would increase correspondingly, the extinguishing system 3 can respond prematurely in order to prevent the incidence of a fire or of a thermal runaway of the respective battery cell, or at least to delay it significantly. The temperature sensors 7 can be set such that they provide the triggering signal for the control device 5 already far below the temperature above which a thermal runaway of the high-voltage battery 2 occurs. Thus it may be provided, for instance, that the containers 4 of the extinguishing agent are already opened as of 150 degrees Celsius, that the extinguishing agent is discharged from then into the interior of the high-voltage battery 2 and displaces the air in it. As a result, there will be no oxygen inside the high-voltage battery 2, such that the battery cells cannot catch fire.

The auto-ignition temperature of the auto-ignition mechanisms are preferably at least as high as the temperature above which a thermal runaway of the high-voltage battery 2 occurs. If the control device 5 should not function properly, at least a thermal runaway of the high-voltage battery 2 can be prevented or significantly delayed by means of the auto-ignition mechanisms.

The extinguishing system 3 further comprises a duct system 8 connected with the extinguishing agent containers 4, intermediated by the respective seals, not shown here. The duct system 8 comprises a plurality of channels 9, which respectively feature a plurality of discharge openings, not shown here, through which the extinguishing agent can reach the interior of the high-voltage battery 2, and in particular, the interior of respective battery cells of the high-voltage battery 2. Via the duct system 8, the extinguishing agent can be rapidly distributed over the high-voltage battery 2 and delivered to the battery cells.

The extinguishing system 3 further comprises at least one pressure relief valve 10 integrated into a housing of the high-voltage battery 2, through which the air in the interior of the high-voltage battery 2 can flow out when the extinguishing agent flows into the interior of the high-voltage battery 2. Thus, the inflowing extinguishing agent does not have to push against a strong pressure, since the air in the high-voltage battery 2 can easily escape via the pressure relief valve 10. Preferably, multiple such pressure relief valves 10 are provided, for instance one for every battery module or even for every battery cell. Thus, the extinguishing agent can be rapidly distributed throughout the high-voltage battery 2, since the air within the high-voltage battery 2 can easily and rapidly escape.

The described extinguishing system 3 therefore provides a redundant solution, by means of which an extinguishing agent can be delivered to the high-voltage battery 2 when needed. On the one hand, the control device 5 can ensure that the extinguishing agent reaches the interior of the high-voltage battery 2. On the other hand, the auto-ignition mechanism can ensure that the extinguishing agent reaches the interior of the high-voltage battery 2 even in the event of a failure of the control device 5. An incidence and spreading of fire within the high-voltage battery 2 can thus be particularly reliably prevented by means of the extinguishing system 3.

The invention claimed is:

1. An extinguishing system for a high-voltage battery of a motor vehicle, comprising:
   at least one extinguishing agent container with a gaseous extinguishing agent;
   a seal for sealing the extinguishing agent container, which prevents an outflow of the extinguishing agent into the interior of the high-voltage battery, the seal being openable upon the incidence of a triggering signal, thus allowing the extinguishing agent to flow into the interior of the high-voltage battery and to displace any air comprised therein; and an auto-ignition mechanism that interacts with the seal, which auto-ignites at a certain auto-ignition temperature and opens the seal;

wherein an alarm signal is emitted in the motor vehicle as soon as the seal is opened;

wherein information is dispensed about the degree in which the condition of the high-voltage battery is critical; and wherein a prompt is given, based on the information, regarding a driving capability of the vehicle.

2. The extinguishing system according to claim 1, wherein the auto-ignition mechanism features a fuse which auto-ignites as of the auto-ignition temperature and opens the seal.

3. The extinguishing system according to claim 2, further comprising a signaling connection with a crash sensor for providing the triggering signal.

4. The extinguishing system according to claim 2, further comprising a signaling connection with a temperature sensing system of the extinguishing system, which is designed to measure a temperature of the high-voltage battery and to provide the triggering signal when the measured temperature is higher than a predetermined temperature.

5. The extinguishing system according to claim 2, wherein the auto-ignition temperature is not greater than the temperature above which a thermal runaway of the high-voltage battery occurs.

6. The extinguishing system according to claim 2, wherein the extinguishing system features a duct system connected with the extinguishing agent container, intermediated by the seal, with discharge openings through which the extinguishing agent may flow into the interior of the high-voltage battery.

7. The extinguishing system according to claim 1, further comprising a signaling connection with a crash sensor for providing the triggering signal.

8. The extinguishing system according to claim 7, further comprising a signaling connection with a temperature sensing system of the extinguishing system, which is designed to measure a temperature of the high-voltage battery and to provide the triggering signal when the measured temperature is higher than a predetermined temperature.

9. The extinguishing system according to claim 7, wherein the auto-ignition temperature is not greater than the temperature above which a thermal runaway of the high-voltage battery occurs.

10. The extinguishing system according to claim 1, further comprising a signaling connection with a temperature sensing system of the extinguishing system, which is designed to measure a temperature of the high-voltage battery and to provide the triggering signal when the measured temperature is higher than a predetermined temperature.

11. The extinguishing system according to claim 10, wherein the temperature sensing system features temperature sensors, integrated into every battery cell of the high-voltage battery, for measuring the respective cell temperatures of every battery cell of the high-voltage battery.

12. The extinguishing system according to claim 11, wherein the predetermined temperature is below the temperature above which a thermal runaway of the high-voltage battery occurs, and in that the auto-ignition temperature is above the predetermined temperature.

13. The extinguishing system according to claim 11, wherein the auto-ignition temperature is not greater than the temperature above which a thermal runaway of the high-voltage battery occurs.

14. The extinguishing system according to claim 10, wherein the predetermined temperature is below the temperature above which a thermal runaway of the high-voltage battery occurs, and in that the auto-ignition temperature is above the predetermined temperature.

15. The extinguishing system according to claim 14, wherein the auto-ignition temperature is not greater than the temperature above which a thermal runaway of the high-voltage battery occurs.

16. The extinguishing system according to claim 10, wherein the auto-ignition temperature is not greater than the temperature above which a thermal runaway of the high-voltage battery occurs.

17. The extinguishing system according to claim 1, wherein the auto-ignition temperature is not greater than the temperature above which a thermal runaway of the high-voltage battery occurs.

18. The extinguishing system according to claim 1, wherein the extinguishing system features a duct system connected with the extinguishing agent container, intermediated by the seal, with discharge openings through which the extinguishing agent may flow into the interior of the high-voltage battery.

19. The extinguishing system according to claim 1, wherein the extinguishing system further comprises at least one pressure relief valve integrated into a housing of the high-voltage battery, through which the air in the interior of the high-voltage battery can flow out when the extinguishing agent flows into the interior of the high-voltage battery.

20. The extinguishing system according to claim 1, wherein a repair shop is informed as soon as the seal is opened.

* * * * *